United States Patent
Rasmussen et al.

(10) Patent No.: US 6,865,305 B2
(45) Date of Patent: Mar. 8, 2005

(54) ADAPTIVELY CONTROLLABLE POLARIZATION MODE DISPERSION COMPENSATOR

(75) Inventors: Jens C. Rasmussen, Kawasaki (JP); George Ishikawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/739,063

(22) Filed: Dec. 19, 2003

(65) Prior Publication Data

US 2004/0131298 A1 Jul. 8, 2004

Related U.S. Application Data

(63) Continuation of application No. PCT/JP01/07567, filed on Aug. 31, 2001.

(51) Int. Cl.⁷ .............................................. G02B 6/27
(52) U.S. Cl. ....................................... 385/11; 359/483
(58) Field of Search ........................ 385/11; 359/494, 359/497, 499

(56) References Cited

U.S. PATENT DOCUMENTS

| | | | | |
|---|---|---|---|---|
| 5,377,283 A | * | 12/1994 | Blake et al. | 385/11 |
| 5,930,414 A | | 7/1999 | Fishman et al. | |
| 6,559,991 B1 | * | 5/2003 | Farley et al. | 398/152 |
| 6,728,491 B1 | * | 4/2004 | Ooi et al. | 398/147 |
| 2002/0018267 A1 | | 2/2002 | Sun et al. | |

OTHER PUBLICATIONS

Ono et al., "10 Gb/s PMD Compensation Field Experiment over 452km Using Principal State Transmission Method", OFC '99, paper PD44–1 to PD44–3.

Francia et al., "Simple Dynamic Polarization Mode Dispersion Compensator", Electronic Letters, 1999, vol. 35, No. 5, pp. 414–415.

Ooi et al., "Automatic Polarization–Mode Dispersion Compensation in 40–Gbit/s Transmission", OFC/IOOC '99, paper WE5, pp. 86–88.

Heismann, et al., "Automatic Compensation of First–Order Polarization Mode Dispersion in a 10Gb/s Transmission System", ECOC '98, 1998, pp. 529–530.

Poole et al., "Phenomenological Approach to Polarisation Dispersion in Long Single–Mode Fibres", Electronic Letters, 1986, vol. 22, No. 19, pp. 1029–1030.

Noé et al., "Polarization Mode Dispersion Compensation at 10, 20, and 40 Gb/s with Various Optical Equalizers", Journal of Lightwave Technology, 1999, vol. 17, No. 9, pp. 1602–1616.

Hinz et al., "Distributed Fiberoptic PMD Compensation of a 60 ps Differental Group Delay at 40 Gbit/s", ECOC '99, 1999, pp. II–136 to II–137.

Gordon et al., "PMD Fundamentals: Polarization Mode Dispersion in Optical Fibers", PNAS, 2000, vol. 97, No. 9, pp. 4541–4550.

Li et al., "Higher Order Error of Discrete Fiber Model and Asymptotic Bound on Multistaged PMD Compensation," Journal of Lightwave Technology, 2000, vol. 18, No. 9, pp. 1205–1213.

Ciprut et al., "Second–Order Polarization Mode Dispersion: Impact on Analog and Digital Transmissions", Journal of Lightwave Technology, 1998, vol. 16, No. 5, pp. 757–771.

(List continued on next page.)

*Primary Examiner*—John D. Lee
*Assistant Examiner*—Jennifer Doan
(74) *Attorney, Agent, or Firm*—Staas & Halsey LLP

(57) ABSTRACT

A polarization converter followed by two PMFs adjusts principal states of polarization (PSP) of a PMD compensator against PSP of an optical transmission line, and a mode-coupling adjuster between the PMFs adjusts a differential group delay and a PSP rotation rate of the PMFs.

9 Claims, 20 Drawing Sheets

OTHER PUBLICATIONS

Francia et al., "PMD Second–Order Effects on Pulse Propagation in Single–Mode Optical Fibers", IEEE Photonics Technology Letters, 1998, vol. 10, No. 12, pp. 1739–1741.

Weiershausen et al., "Polarization–Mode Dispersion in Fibre Transmission: Theroretical Approach, Impact on Systems, and Suppression of Signal–Degradation Effects", ECOC '99, 1999, pp. II–130 to II–133.

Glingerner et al., "Polarization Mode Dispersion Compensation At 20 Gb/S With A Compact Distributed Equalizer In LiNoO3", OFC '99, paper PD29, pp. PD29–1 to PD29–3.

Ishikawa et al., "Polarization–mode Dispersion Sensitivity and Monitoring in 40–Gbit/s OTDM and 10–Git/s NRZ Transmission Experiments", OFC '98 Technical Digest, paper WC5, pp. 117–119.

Kikuchi et al., "Polarization–Mode Dispersion (PMD) Detection Sensitivity of Degree of Polarization Method for PMD Compensation", ECOC' 99, 1999, pp. II–8 to II–9.

Rosenfeldt et al., "PMD Compensation in 10 Gbit/s NRZ Field Experiment Using Polarimetric Error Signal", Electronic Letters, 2000, vol. 36, No. 5, pp. 448–450.

Shieh et al., "Dynamic Polarization–Mode–Dispersion Compensation in WDM Systems", ECOC 2000, pp. 41–42.

Noé et al., "Fiber–Based Distributed PMD Compensation at 20 GB/s", ECOC '98, 1998, pp. 157&159.

Patscher et al., "Component for Second–Order Compensation of Polarisation–Mode Dispersion", Electronic Letters, 1997, vol. 33, No. 13, pp. 1157–1159.

Sandel et al., "Automatic Polarisation Mode Dispersion Compensation in 40 Gbit/s Optical Transmission System", Electronic Letters, 1998, vol. 34, No. 23, pp. 2258–2259.

Yu et al., "Higher Order Polarization Mode Dispersion Compensation Using a Fixed Time Delay Followed by a Varible Time Delay", IEEE Photonics Technology Letters, vol. 13, No. 8, 2001, pp. 863–865.

* cited by examiner

ADAPTIVELY CONTROLLABLE POLARIZATION MODE DISPERSION COMPENSATOR

CROSS REFERENCE TO RELATED APPLICATION

This application is a continuation application of International PCT Application No. PCT/JP01/07567 which was filed on Aug. 31, 2001.

BACKGROUND OF THE INVENTION

1. Field of the Invention

The present invention relates to a polarization mode dispersion (PMD) compensator which is used to countermeasure signal distortion due to PMD for high-speed optical signals in the case the transmission distance or bit-rate is limited by the PMD of the transmission span (transmission line).

2. Description of the Related Art

The demand for higher capacity of optical transmission systems is increasing continuously. To increase the amount of data which can be transmitted in a specific amount of time through one optical fiber two methods exist in principal. While one method is wavelength division multiplexing (WDM), the other method is time division multiplexing (TDM).

To realize data-rates in the order of several Terabit/s a combination of TDM and WDM has to be used. Decreasing the number of channels in a WDM system while increasing the bit-rate each channel transports has several advantages. Past systems operated with 2.5 Gbit/s, current systems make use of 10 Gbit/s per channel and future systems will operate with 40 Gbit/s or even higher data-rates.

But with increasing data-rates a phenomenon, the so called polarization mode dispersion (PMD), becomes a transmission distance limiting physical property of an optical fiber. A PMD value of e.g. 5 ps does not affect a signal with a data-rate of 2.5 Gbit/s with a bit-duration of 400 ps in the case nonreturn-to-zero (NRZ) modulation format is used. But the same PMD value of 5 ps can contribute to signal distortion in the case of 10 Gbit/s signals (NRZ bit-duration equals 100 ps) and highly distorts a 40 Gbit/s signal (NRZ bit-duration equals 25 ps).

Even more worse, PMD is a statistical property due to the environmental dependence of birefringence and mode-coupling of a single-mode fiber. This means that, with some probability, the instantaneous differential group delay (DGD) can be much higher or lower than the mean DGD, i.e. PMD, of the fiber. While the instantaneous DGD is just the so called 1st-order PMD which follows a Maxwellian probability distribution, additionally higher-order PMD with an own statistical distribution due to the random mode-coupling exists.

Those are for example the DGD slope and the rotation rate of the principal states of polarization (PSP), being the 2nd-order PMD coefficients. For those who are skilled in the art, it is well known that several definitions of higher-order PMD exist. It is to be emphasized here, that in the case a signal experiences unacceptable high distortion due to accumulated PMD over the desired transmission distance, an active and adaptively adjustable compensation method is required to countermeasure this type of signal degradation.

Beside electrical and hybrid electric-optical compensation schemes all-optical schemes have been proposed. Among them, the all-optical compensation schemes will be discussed in the following.

All compensation schemes require a distortion analyzing device at the receiver side. The distortion analyzing device provides feedback to a control logic with a dedicated algorithm to adaptively adjust the parameters of a compensating device such that the signal experiences a minimum distortion. In general one can classify all-optical 1st-order PMD compensation schemes into the following three categories:

1. Polarization converter located at the transmitter side

FIG. 1 shows a system including this type of compensator. The system includes a transmitter 11 (Tx), a polarization converter 12 (PC), a transmission span 13, a receiver 14 (Rx) and a distortion analyzer 15.

In this system the distortion analyzer 15 analyzes distortion of an optical signal on the transmission span 13 and outputs a feedback signal to the polarization converter 12. According to the feedback signal the polarization converter 12 adaptively adjusts the input state of polarization to one of the two input PSP of the transmission span 13 (T. Ono, Y. Yano, L. D. Garrett, J. A. Nagel, M. J. Dickerson, and M. Cvijetic, "10 Gb/s PMD compensation filed experiment over 452 km using principal state transmission method," OFC'99, paper PD44, 1999).

The compensator makes use of the fact that in the case the signal's state of polarization is aligned to one of the input PSP of the transmission span, the output state of polarization does not depend on wavelength to the first order. This further implies that under this launch condition the signal experiences least distortion.

2. Polarization converter followed by a polarization maintaining fiber (PMF) located at the receiver side FIG. 2 shows a system including this type of compensator. The system includes the transmitter 11, the transmission span 13, the receiver 14, a polarization converter 21, a PMF 22 and a distortion analyzer 23. The polarization mode dispersion compensator (PMDC) consists of the polarization converter 21 and the PMF 22.

In this system the polarization converter 21 has to adaptively adjust the input principal state of polarization (PSP) of the concatenated transmission span 13 and PMDC to the state of input polarization (C. Francia, F. B. Bruyère, J. P. Thiéry, and D. Penninckx, "Simple dynamic polarisation mode dispersion compensator," Electronics Letters, Vol. 35, No. 5, pp. 414–415, 1999; H. Ooi, Y. Akiyama, and G. Ishikawa, "Automatic polarization-mode dispersion compensation in 40-Gbit/s transmission," OFC'99, paper WE5, pp. 86–88, 1999).

This shows good results until the instantaneous DGD of the transmission span is lower than a value being somewhat lower than the DGD of the PMDC's PMF. If the instantaneous DGD of the transmission span becomes higher than this value or exceeds the PMDC's PMF DGD value, a better method is to adjust the fast eigenstate of the PMF to the slow output PSP of the transmission span. Here, an eigenstate represents a characteristic of a medium and a state of polarization represents a characteristic of an optical signal or light.

Under those circumstances the transmission span's DGD is partly compensated for. The residual DGD of the concatenated transmission span and PMDC is the difference between the instantaneous DGD of the transmission span and the DGD of the PMF.

3. Polarization converter followed by a polarization beam splitter (PBS), an adjustable differential group delay line and a polarization beam combiner (PBC) located at the receiver side FIG. 3 shows a system including this type of compensator. The system includes the transmitter 11, the transmission span 13, the receiver 14, a polarization converter 31, a PBS 32, an adjustable delay 33, a PBC 34 and a distortion analyzer 35.

In this system the polarization converter 31 has to adaptively adjust its fast eigenstate of polarization to the slow output PSP of the transmission span and, furthermore, adjust its DGD to the instantaneous DGD of the transmission span (F. Heismann, D. A. Fishman, and D. L. Wilson, "Automatic compensation of first-order polarization mode dispersion in a 10 Gb/s transmission system," ECOC'98, pp. 529–530, 1998).

All of the above mentioned schemes to countermeasure signal distortion due to PMD only compensate for so called 1st-order PMD. They do not take into account that the DGD and the PSP are functions of wavelength.

FIGS. 4, 5 and 6 show typical functions of the DGD over wavelength, respectively, of fibers with PMD=5, 10 and 20 ps. In FIGS. 4, 5 and 6, the functions of the DGD are shown in a range of wavelength between 1545 nm and 1555 nm. FIGS. 7, 8 and 9 show typical variation of the PSP over wavelength, respectively, of fibers with PMD=5, 10 and 20 ps. In FIGS. 7, 8 and 9, the variation of the PSP are shown in a range of wavelength $\lambda$ between 1545 nm and 1555 nm at 0.01-nm intervals using the Poincaré sphere representation. A black point represents a point on the front of the sphere, while a white point represents a point on the back of it. The presented graphs of the DGD and the PSP are taken from simulation studies for clarity reasons.

The spectral width of a modulated signal is not infinitely small. While the spectral component at the center wavelength of a modulated signal does not experience distortion due to PMD after 1st-order compensation, the other spectral components do (C. D. Poole and R. E. Wagner, "Phenomenological approach to polarisation dispersion in long single-mode fibers," Electronics Letters, Vol. 22, No. 19, pp. 1029–1030, 1986). Even more worse, the compensation schemes shown in FIGS. 2 and 3, which are located at the receiver side, compensate for the DGD at the center wavelength but add additional PMD for the spectral components being apart from the center wavelength.

To compensate also for so called higher-order PMD, the PMD characteristic of the compensation scheme must reversely match the PMD characteristic of the transmission span (R. Noé, D. Sandel, M. Yoshida-Dierolf, S. Hinz, V. Mirvoda, A. Schöpflin, C. Glingener, E. Gottwald, C. Scheerer, G. Fischer, T. Weyrauch, and W. Haase, "Polarization mode dispersion compensation at 10, 20, and 40 Gb/s with various optical equalizers," Journal of Lightwave Technology, Vol. 17, No. 9, 1999).

For the above shortly discussed 1st-order compensation schemes this can only be fulfilled for the center wavelength of the signal. To further improve the compensation performance by means of matching the PMD characteristic of the transmission span for all or at least the spectral components of the signal near the center wavelength, multi-stage PMD compensation schemes have been proposed.

Those are either composed of stages comprising a polarization converter and a variable delay line (D. A. Fishman, F. L. Heismann, and D. L. Wilson, "Method and apparatus for automatic compensation of first-order polarization mode dispersion (PMD)," U.S. Pat. No. 5,930,414) or a polarization converter and a fixed DGD (e.g. PMF) (S. Hinz, D. Sandel, M. Yoshida-Dierolf, R. Noé, R. Wessel, and H. Suche, "Distributed fiberoptic PMD compensation of a 60 ps differential group delay at 40 Gbit/s," ECOC'99, pp. II 136-II 137, 1999).

FIG. 10 shows a system according to the former multi-stage PMD compensation scheme. This system includes 1st through nth compensators 41 and a distortion analyzer 42. Each of the compensators 41 consists of the polarization converter 31, the PBS 32, the adjustable delay 33 and the PBC 34 shown in FIG. 3. While FIG. 11 shows a system according to the latter multi-stage PMD compensation scheme. This system includes 1st through nth compensators 51 and a distortion analyzer 52. Each of the compensators 51 consists of the polarization converter 21 and the PMF 22 shown in FIG. 2.

To those who are skilled in the art, it is well understood that with an increasing number of stages the principle performance will increase. The more stages are used the better the PMD characteristic of the transmission span can be matched by the PMDC. But also the complexity due to the added degrees of freedom increases. The increased complexity will make it difficult to adaptively adjust the PMD characteristic of the compensation scheme. A mathematical description of PMD makes use of the so called PMD vector (J. P. Gordon and H. Kogelnik, "PMD fundamentals: Polarization mode dispersion in optical fibers," PNAS, Vol. 97, No. 9, pp. 4541–4550, 2000). The PMD vector $\vec{P}$ can be separated into its two components $\tau$ (DGD) and $\vec{p}$ (PSP) as follows.

$$\vec{P}(\omega) = \tau(\omega) \cdot \vec{p}(\omega) \qquad (1)$$

While the DGD is also referred to as 1st-order PMD, 2nd-order PMD parameters are calculated by deriving $\vec{P}$ with respect to the frequency $\omega$ as follows.

$$\frac{d\vec{P}(\omega)}{d\omega} = \frac{d\tau(\omega)}{d\omega} \cdot \vec{p}(\omega) + \tau(\omega) \cdot \frac{d\vec{p}(\omega)}{d\omega} \qquad (2)$$

The 2nd-order PMD is composed of a polarization dependent chromatic dispersion $$\frac{d\tau(\omega)}{d\omega} \quad \text{[ps/nm]}$$

(DGD slope) component and the rotation rate of the PSP $$\frac{d\vec{p}(\omega)}{d\omega} \quad \text{[rad/nm]}.$$

Rotation rate of the PSP is measured in units of radians per nanometer. It leads to the effect that every spectral component of a modulated signal has its own associated PSP. Dependent on the state of input polarization of the modulated signal, the power of every spectral component is split into its associated two PSP (ratio of power splitting depends on angle between the state of input polarization of the signal and the PSP of the fiber at the respective wavelength), whereby the two polarization components experience a DGD.

Further derivation leads to 3rd-order PMD parameters as follows.

$$\frac{d^2\vec{P}(\omega)}{d\omega^2} = \frac{d^2\tau(\omega)}{d\omega^2} \cdot \vec{p}(\omega) + \tau(\omega) \cdot \frac{d^2\vec{p}(\omega)}{d\omega^2} + 2 \cdot \frac{d\tau(\omega)}{d\omega} \cdot \frac{d\vec{p}(\omega)}{d\omega} \qquad (3)$$

$$\frac{d^2\tau(\omega)}{d\omega^2} \quad \text{and} \quad \frac{d^2\vec{p}(\omega)}{d\omega^2}$$

represent the chromatic dispersion slope and the change rate of PSP rotation, respectively. In the case the vectorial sum of the transmission span's PMD vector and the PMD vector of a PMD compensator is zero at least within the spectral bandwidth of the modulated signal, signal distortion due to PMD is perfectly mitigated.

Because perfect mitigation requires a huge number of DGD sections interleaved by polarization converters (Y. Li, A. Eyal, and A. Yariv, "Higher order error of discrete fiber model and asymptotic bound on multistaged PMD compensation," Journal of Lightwave Technology, Vol. 18, No. 9, pp. 1205–1213, 2000), control speed is limited and total size and number of required components makes this type of perfect or nearly perfect compensation scheme unattractive at least from an economical point of view.

Fewer stages will ever leave a residual distortion due to higher-order PMD which they are not designed to compensate for (P. Ciprut et al., "Second-order polarization mode dispersion: Impact on analog and digital transmissions," Journal of Lightwave Technology, Vol. 16, No. 5, pp. 757–771, 1998; C. Francia, F. Bruyère, D. Penninckx, and M. Chbat, "PMD second-order effects on pulse propagation in single-mode optical fibers," IEEE Photonics Technology Letters, Vol. 10, No. 12, pp. 1739–1741, 1998). But for a given transmission span with a specific and not-too-high PMD value, those schemes are able to partly match the PMD vector reversely. This leads to some residual but reduced penalty which has to be taken into account for system design considerations.

FIG. 12 gives a clear image for covered ranges of occurring 1st- (DGD) and 2nd-order (PSP rotation rate) PMD parameters in real fibers. For single mode fibers (SMFs) with PMD values of 4, 8 and 16 ps, $5 \times 10^5$ realizations of a realistic fiber model with 1000 linear birefringent segments has been investigated (W. Weiershausen, R. Leppla, F. Küppers, and H. Schöll, "Polarization-mode dispersion in fibre transmission: Theoretical approach, impact on systems, and suppression of signal-degradation effects," ECOC'99, pp. II 130-II 133, 1999). FIG. 12 shows the PSP rotation rate versus the instantaneous DGD. While the instantaneous DGD follows the well known Maxwellian probability distribution function (not shown here), the maximum occurring PSP rotation rate decreases with increasing DGD.

SUMMARY OF THE INVENTION

It is an object of the present invention to provide a PMDC which compensates for the 1st- and higher-order PMD of an optical transmission line with reduced complexity.

The PMDC according to the first aspect of the present invention comprises a principal-state-of-polarization (PSP) adjuster and a mode-coupling adjuster. The PSP adjuster aligns a PSP of a concatenation of the optical transmission line and the PMDC, to an input state of polarization (SOP) of an optical signal input to the optical transmission line. The mode-coupling adjuster adjusts mode-coupling in the PMDC.

The PSP adjuster corresponds to e.g. a polarization converter and converts any input SOP to an arbitrary output SOP. The mode-coupling adjuster can adjust both DGD and PSP rotation rate of the PMDC by changing mode-coupling. Since the PSP adjuster is separated from the mode-coupling adjuster and independently controllable, the 1st- and higher-order PMD is compensated for. Although the mode-coupling adjuster cannot convert any input SOP to an arbitrary output SOP, it is realized by a simpler device than a polarization converter.

Thus, the PMDC according to the first aspect compensates for not only the 1st-order PMD but also higher-order PMD with reduced complexity.

The PMDC according to the second aspect of the present invention comprises a PSP adjuster, a first birefringent element following the PSP adjuster, a mode-coupling adjuster following the first birefringent element and a second birefringent element following the mode-coupling adjuster. The PSP adjuster aligns a PSP of a concatenation of the optical transmission line and the PMDC, to an input SOP of an optical signal input to the optical transmission line. The mode-coupling adjuster adjusts mode-coupling in the PMDC.

The PSP adjuster corresponds to e.g. a polarization converter and each of the first and second birefringent elements correspond to a birefringent device such as a PMF, which introduces PMD. The mode-coupling adjuster can adjust both DGD and PSP rotation rate of the PMDC by changing mode-coupling of the first and second birefringent elements. The mode-coupling adjuster is realized by a simpler device than a polarization converter as in the first aspect of the present invention.

Thus, the PMDC according to the second aspect compensates for not only the 1st-order PMD but also higher-order PMD with reduced complexity.

DESCRIPTION OF THE PREFERRED EMBODIMENTS

Figure 1:
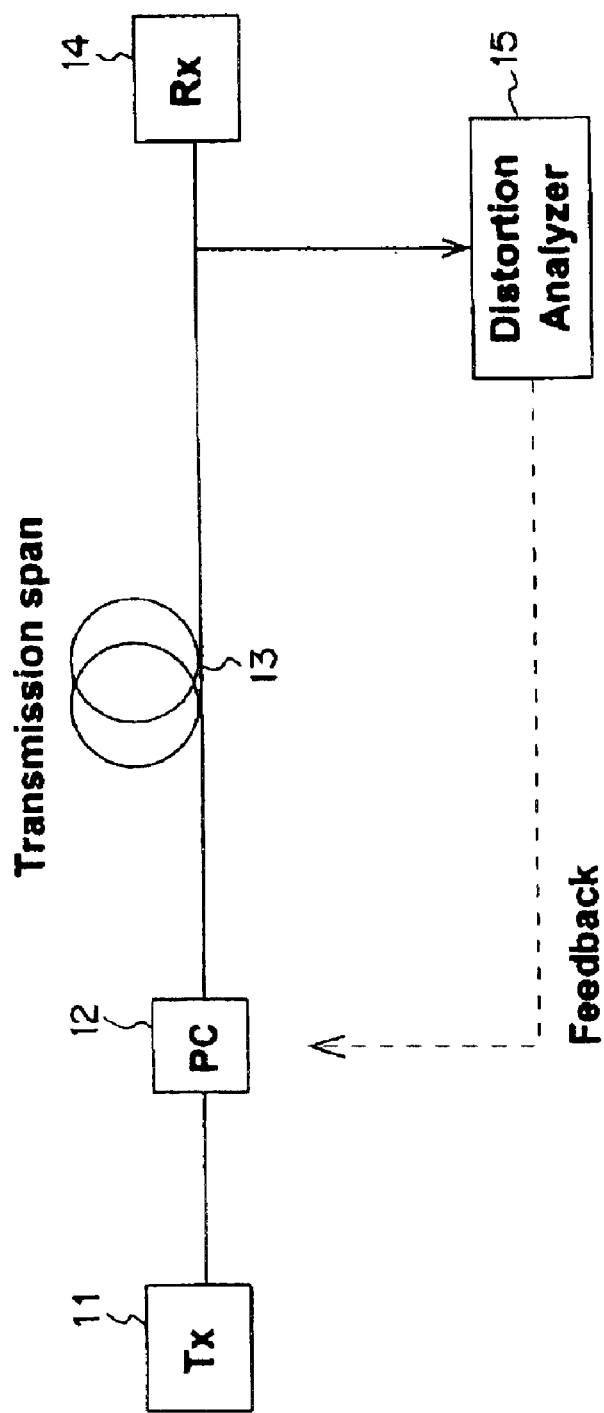
FIG. 1 shows the first 1st-order PMD compensation scheme.
Figure 2:
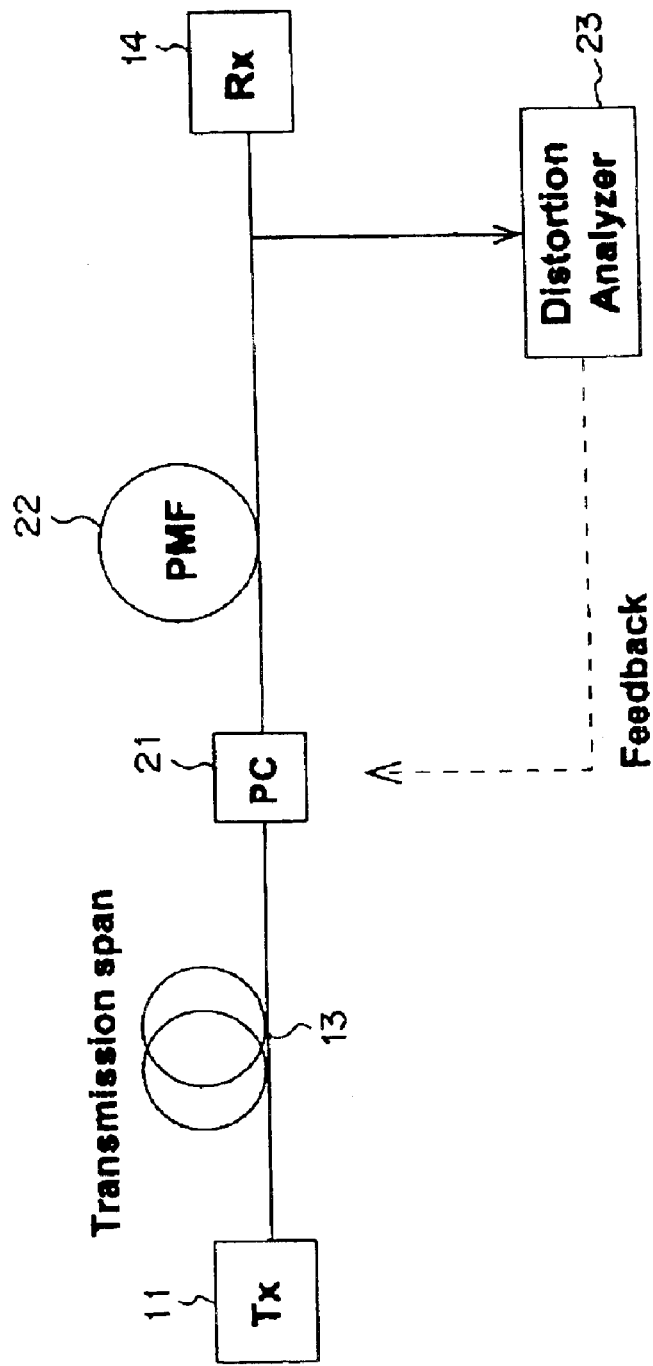
FIG. 2 shows the second 1st-order PMD compensation scheme.
Figure 3:
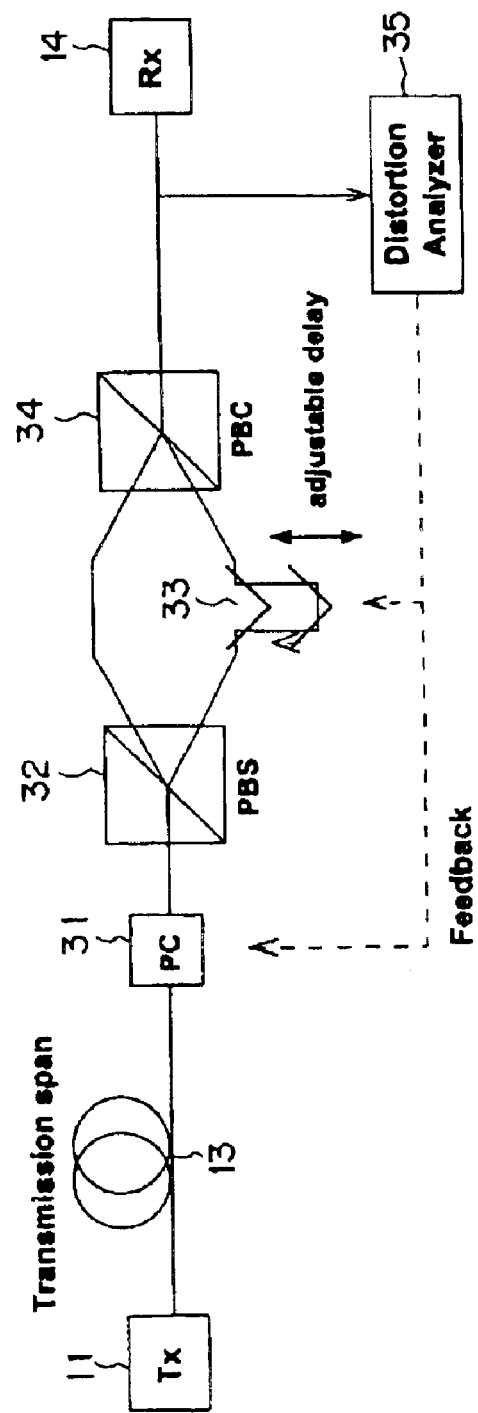
FIG. 3 shows the third 1st-order PMD compensation scheme.
Figure 4:
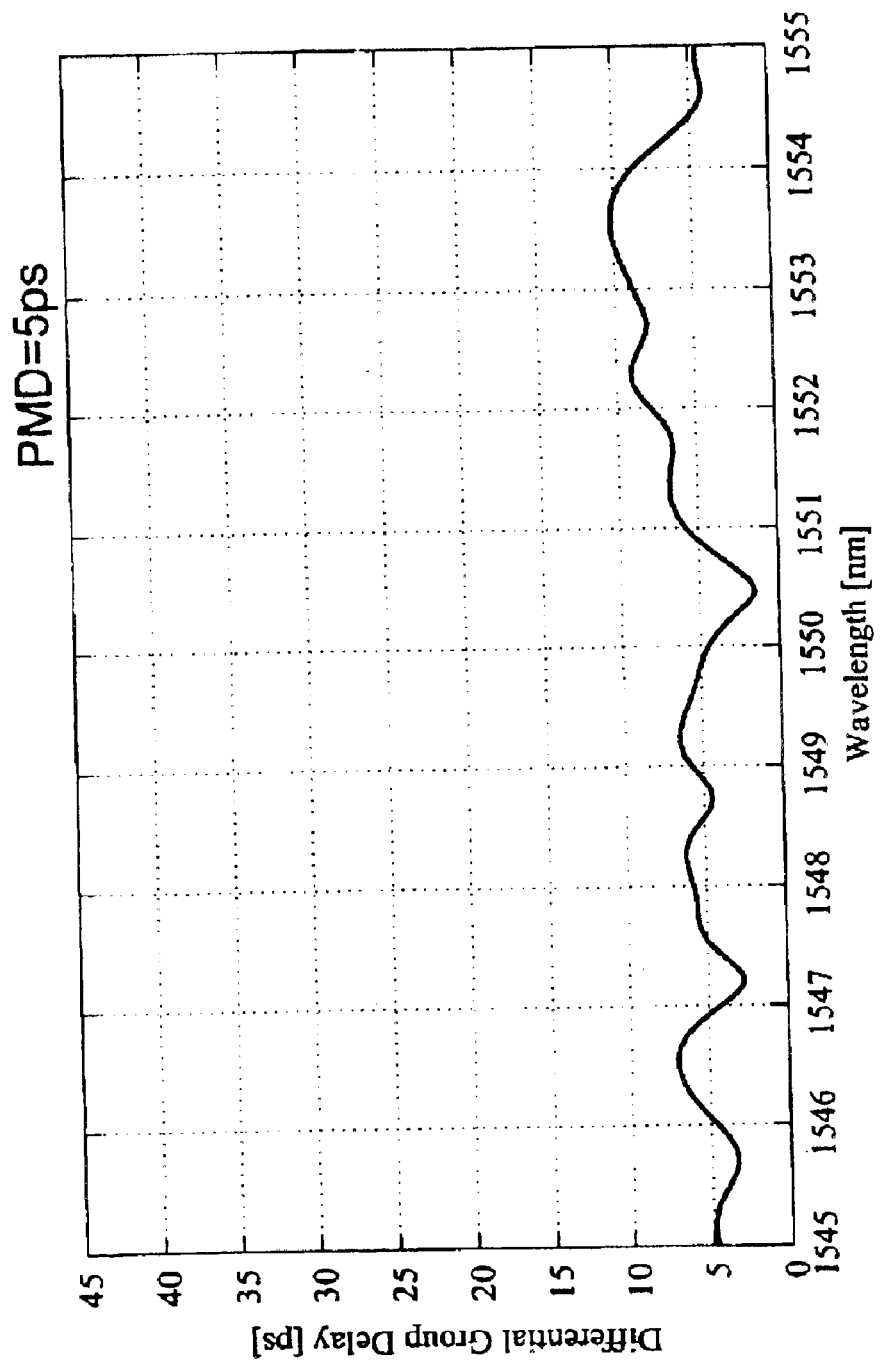
FIG. 4 shows a function of DGD of a fiber with PMD=5 ps over wavelength.
Figure 5:
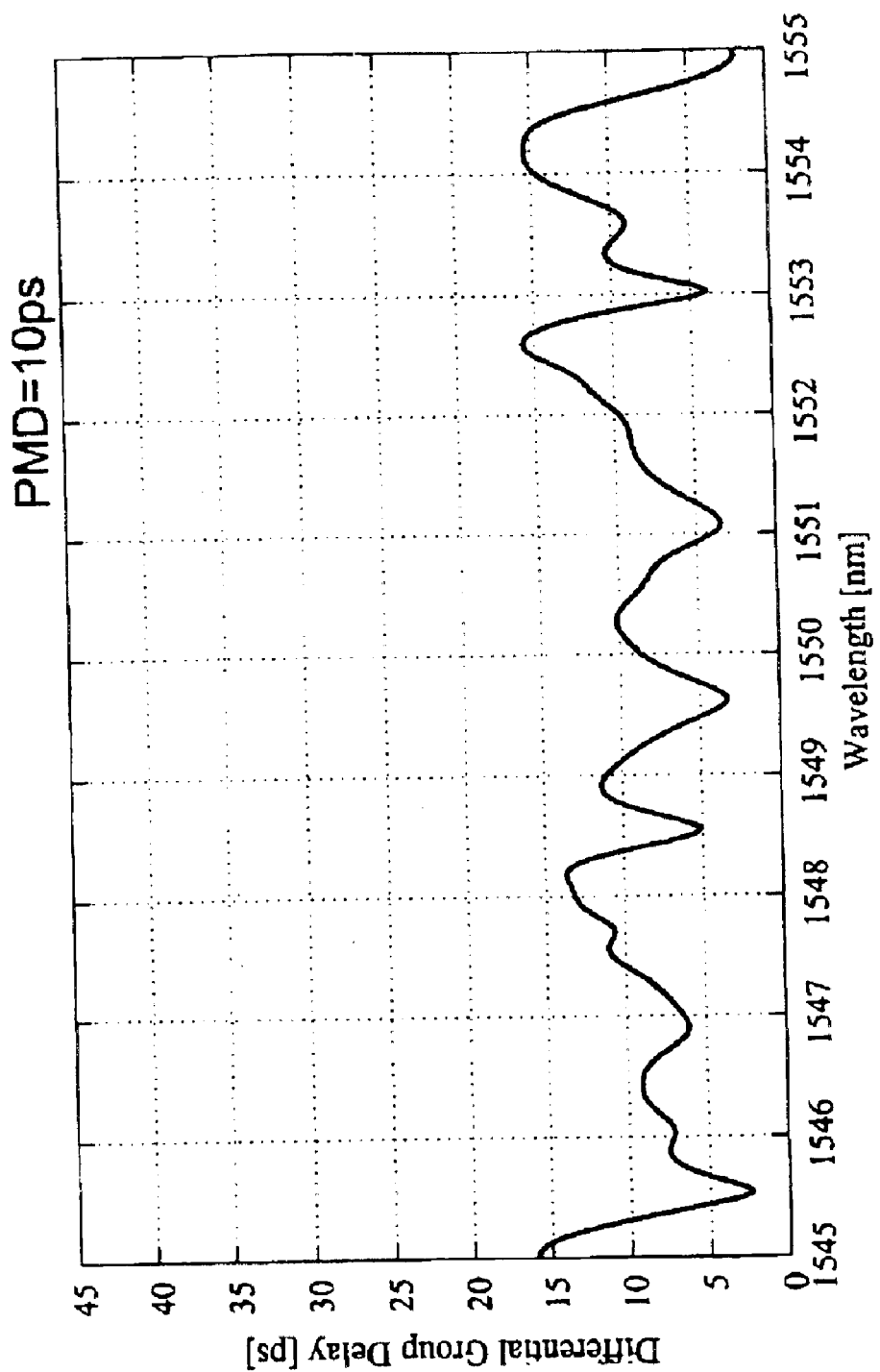
FIG. 5 shows a function of DGD of a fiber with PMD=10 ps over wavelength.
Figure 6:
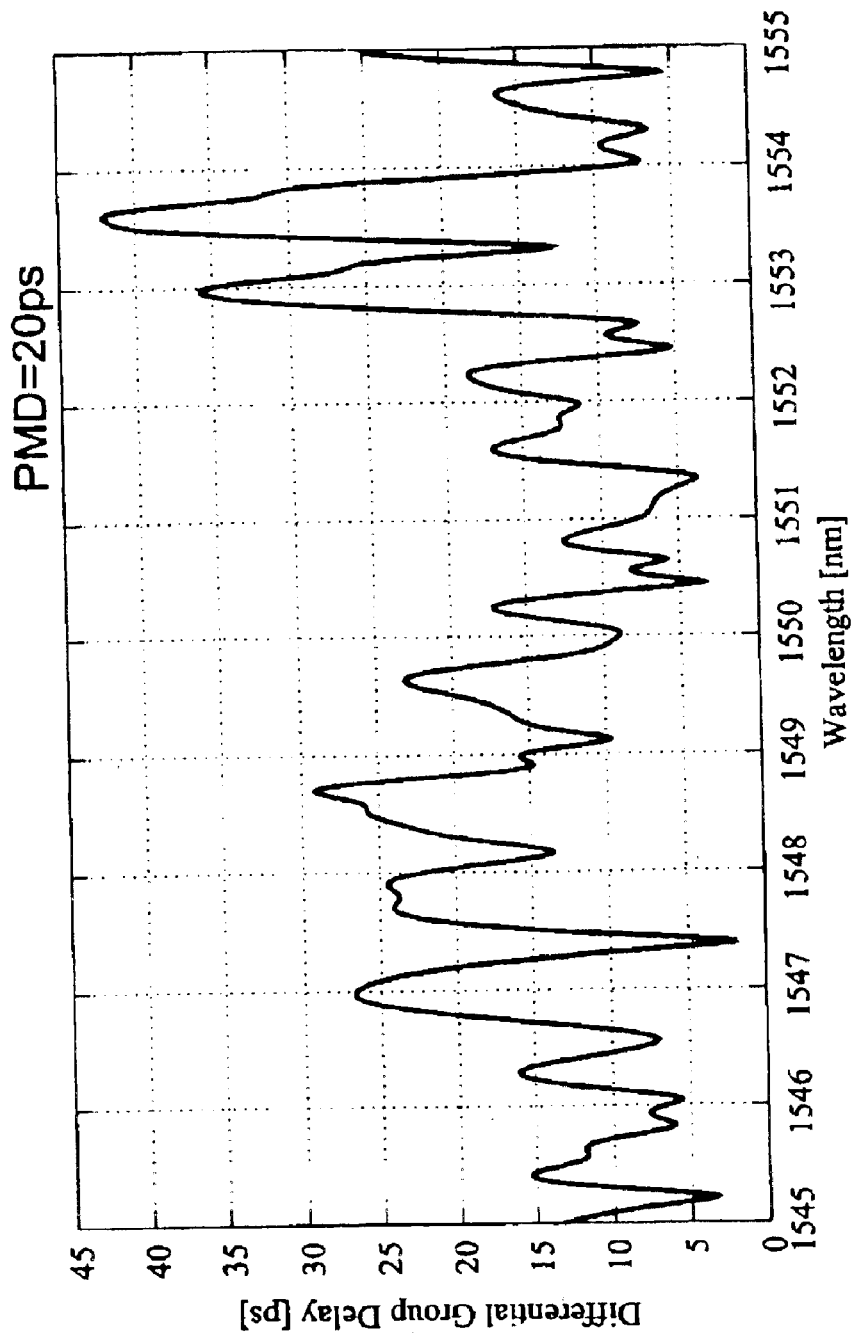
FIG. 6 shows a function of DGD of a fiber with PMD=20 ps over wavelength.
Figure 7:
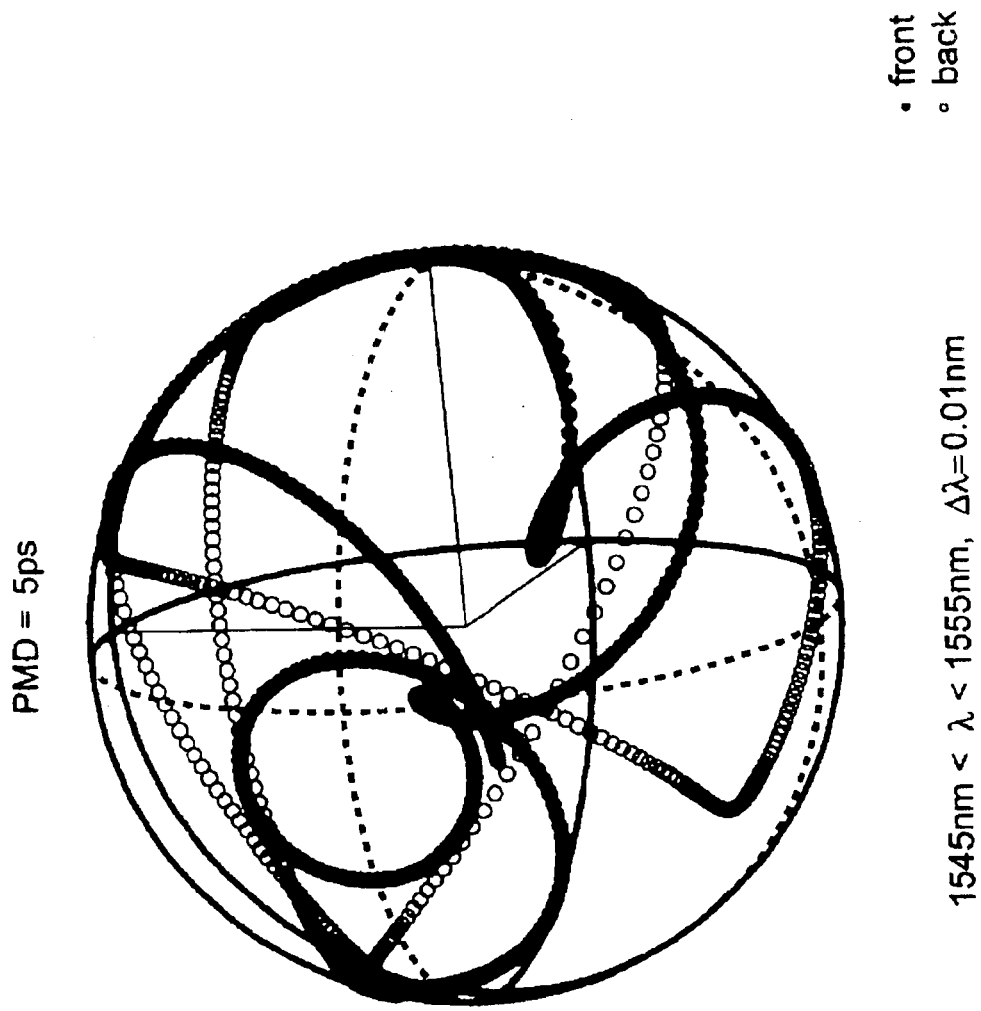
FIG. 7 shows variation of PSP of a fiber with PMD=5 ps over wavelength.
Figure 8:
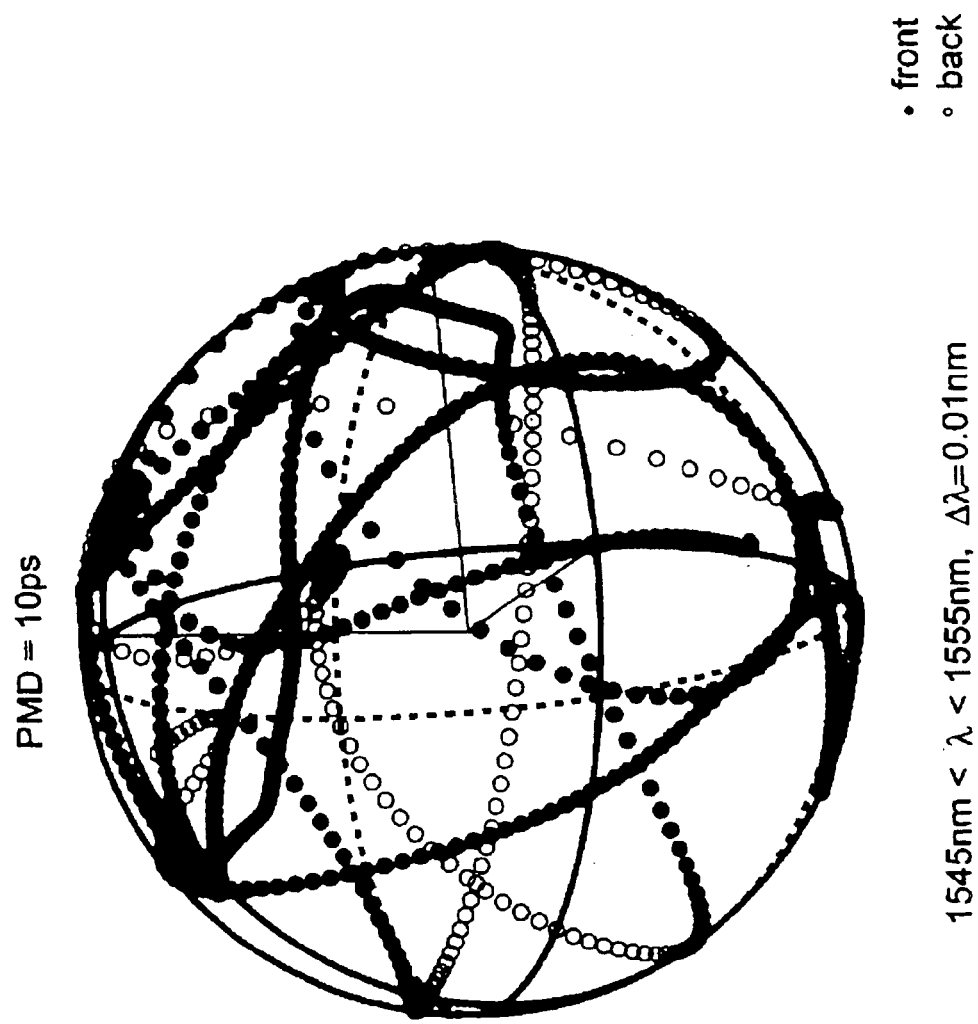
FIG. 8 shows variation of PSP of a fiber with PMD=10 ps over wavelength.
Figure 9:
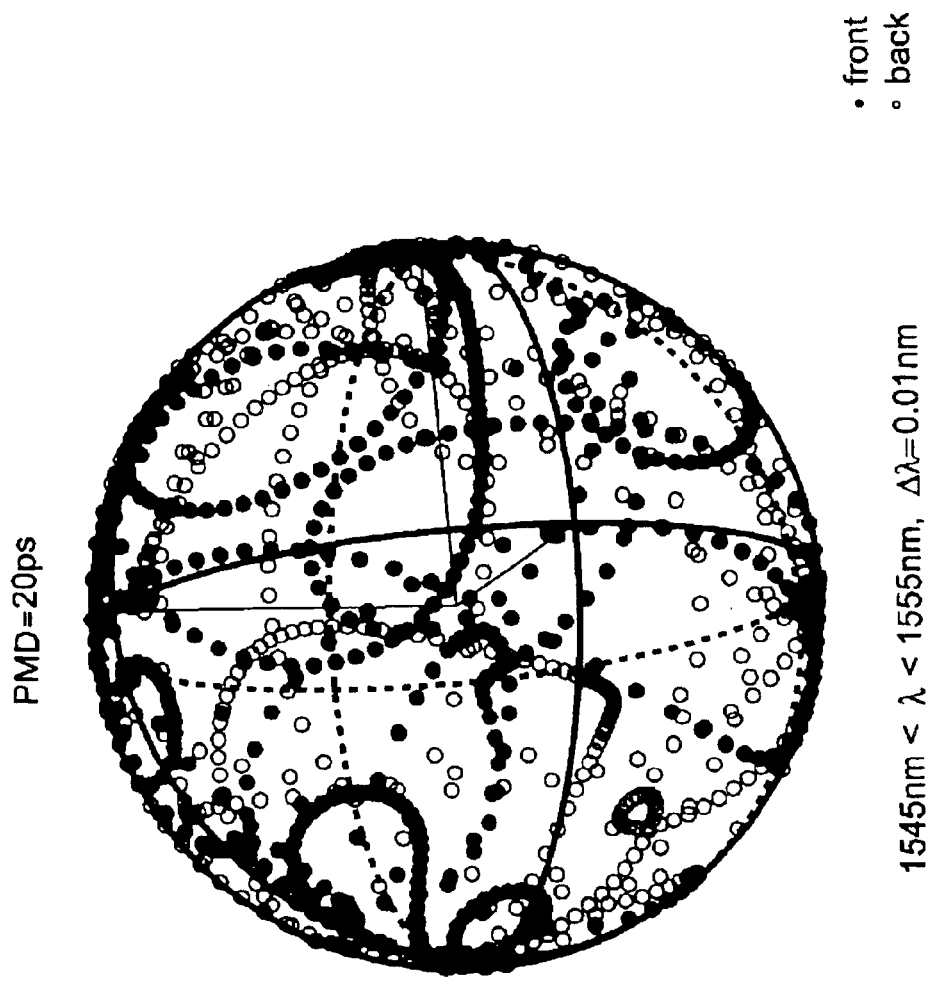
FIG. 9 shows variation of PSP of a fiber with PMD=20 ps over wavelength.
Figure 10:
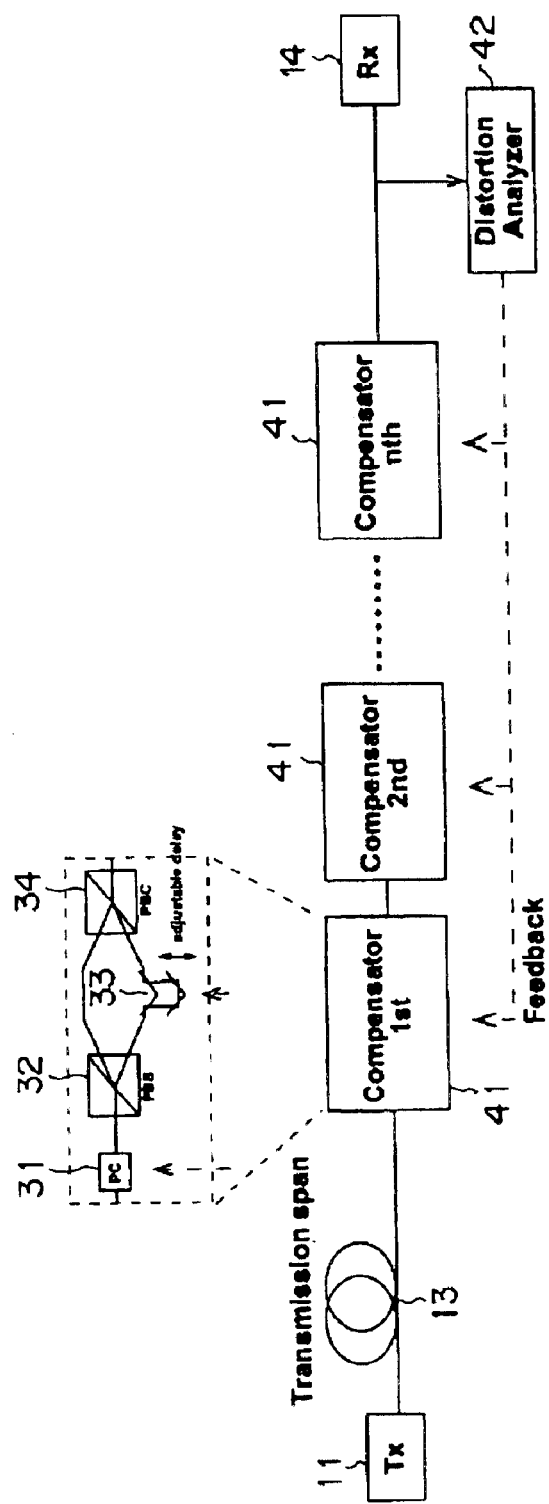
FIG. 10 shows the first multi-stage PMD compensation scheme.
Figure 11:
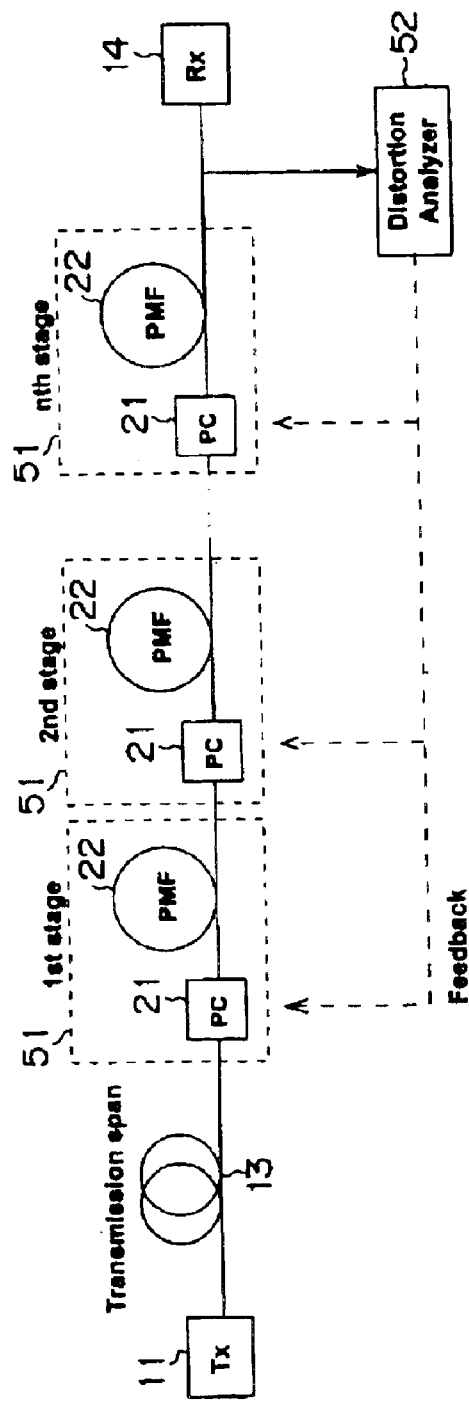
FIG. 11 shows the second multi-stage PMD compensation scheme.
Figure 12:
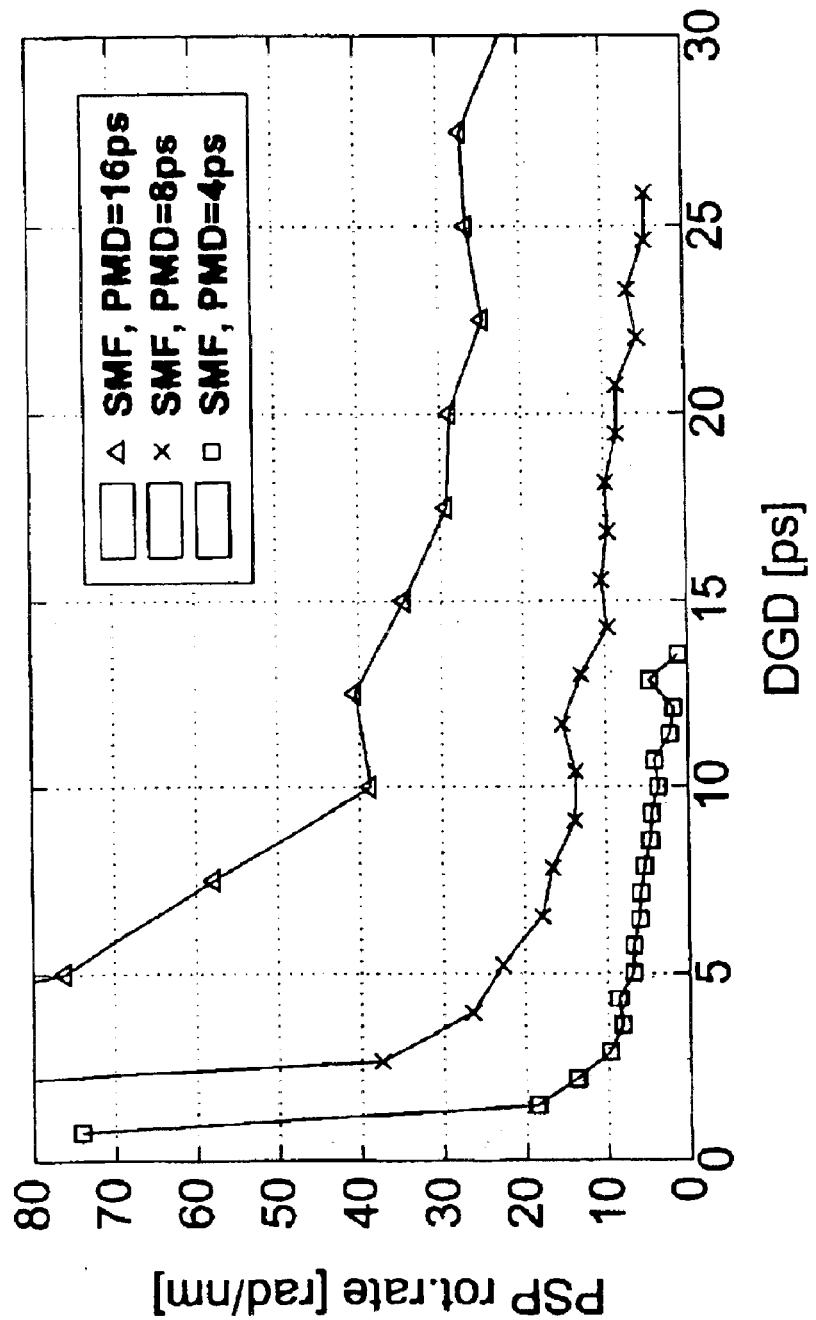
FIG. 12 shows a PSP rotation rate versus an instantaneous DGD.

Hereinafter, preferred embodiments according to the present invention will be described in detail by referring to the drawings.

Figure 13:
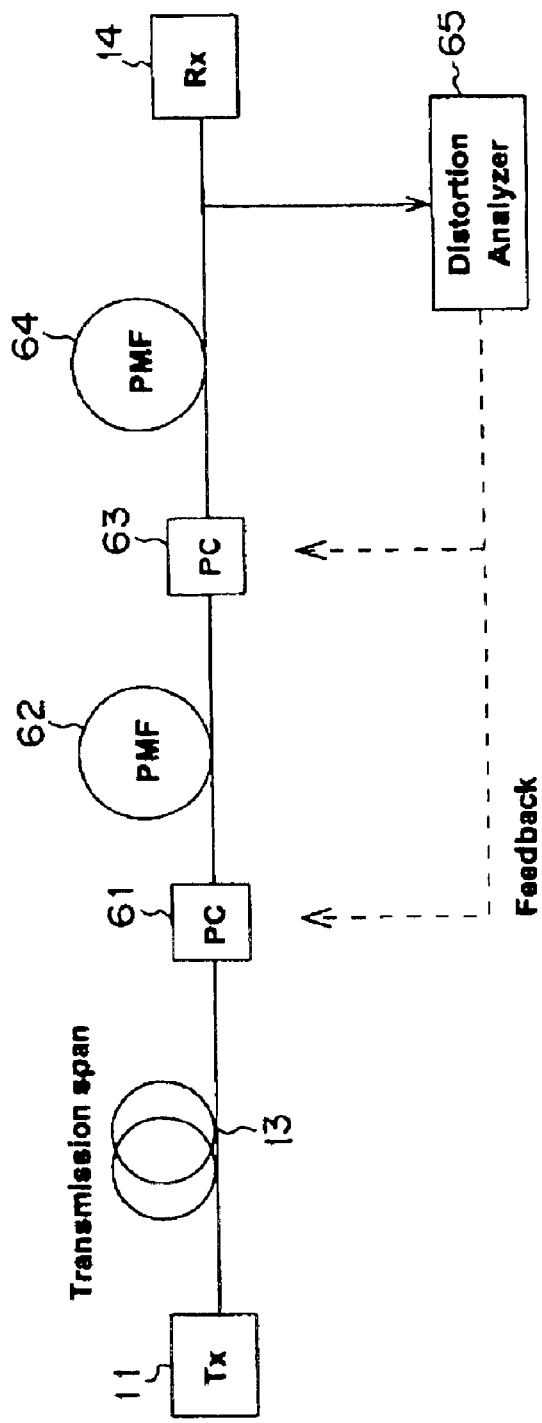
FIG. 13 shows a two-stage PMD compensation scheme.

A PMD compensation scheme, which is in principle able to adjust its characteristic such that it reversely matches the DGD and the PSP rotation rate of the transmission span at the center wavelength of the modulated signal, consists of e.g. two stages of polarization converter and PMF as shown in FIG. 13.

The system shown in FIG. 13 includes the transmitter 11, the transmission span 13, the receiver 14, the 1st-stage polarization converter 61, the 1st-stage PMF 62, the 2nd-stage polarization converter 63, the 2nd-stage PMF 64, and a distortion analyzer 65. The distortion analyzer 65 analyzes distortion of an optical signal after the 2nd-stage PMF 64 and outputs a feedback signal to the polarization converters 61 and 63. In this case, the polarization converters 61 and 63 and the PMFs 62 and 64 form a PMDC, and the polarization converters 61 and 63 can be realized by e.g. the following means.

- multiple rotating wave-plates
- multiple fiber squeezers
- rotatable fiber coils
- integrated optic realization (e.g. on $LiNbO_3$ substrate)
- Soleil-Babinet compensator (crystal or fiber optical)
- multiple tunable birefringent plates (e.g. $LiNbO_3$, special ceramics)
- multiple sections of liquid-crystals
- temperature tuned PMF sections
- multiple fiber sections making use of the Faraday effect or a combination of the above principle schemes In this two-stage compensation scheme, while the polarization converter 63 between the PMFs 62 and 64 operates as a mode-coupling adjuster and adjusts the DGD and the PSP rotation rate of the PMFs, the polarization converter 61 before the PMF 62 operates as a PSP adjuster and adjusts the PSP of the PMDC against the PSP of the transmission span 13. It further controls the direction in which the principal states of the PMDC rotate. Because this scheme not only compensates for DGD at the center wavelength but also adjusts PSP rotation rate, its performance is in principal higher than that of a one-stage compensation scheme.

Taking a closer look at a two-stage compensation scheme, whereby each stage consists of a polarization converter and a PMF it can be shown that the complexity can be reduced without limiting the performance or adjustment range.

It is well known that the DGD (1st-order PMD) of the concatenation of two PMFs only depends on the relative angle $\phi$ between the eigenstates of the PMFs. The DGD is adjustable by means of e.g. mechanical rotation by the angle $\phi$ and obeys the following equation.

$$DGD = \sqrt{+e, rad\ \tau_1^2 + \tau_2^2 + 2\tau_1\tau_2 \cos(2\phi) + ee} \quad (4)$$

whereby $\tau_1$ and $\tau_2$ are the DGD values of the first and second PMFs, respectively.

The main outcome of the present invention is that not only the DGD but also the PSP rotation rate (part of 2nd-order PMD) only depends on the relative angle $\phi$ between the eigenstates of the PMFs. Rotating the eigenaxes of the PMFs while the relative angle $\phi$ between them is hold constant does not change the DGD or PSP rotation rate. This behaviour is illustrated with the two Poincaré spheres in FIG. 14.

Figure 14:
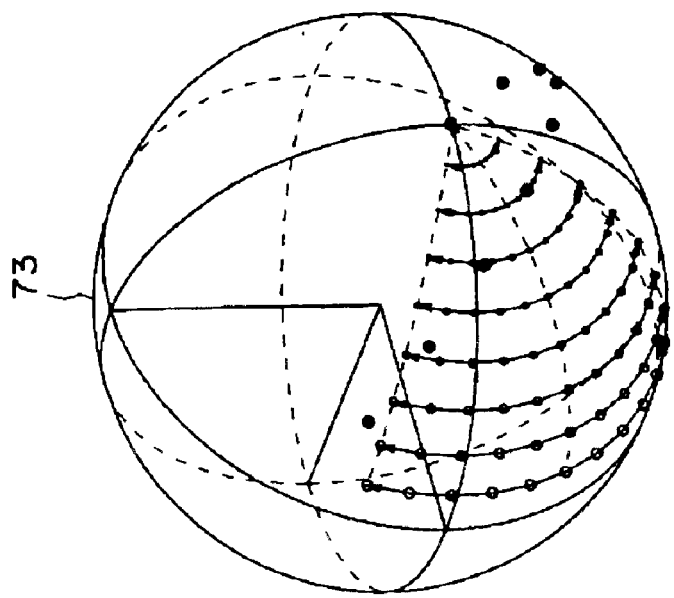
FIG. 14 shows a rotation of eigenaxes of PMFs with the relative angle between them unchanged.
Figure 14:
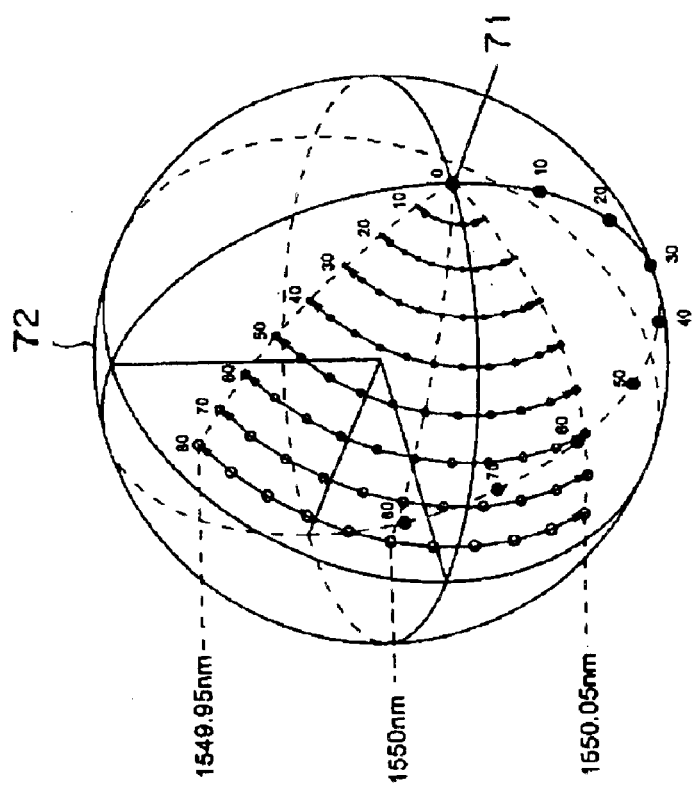

In FIG. 14, black points represent eigenstates of a concatenation of the second polarization converter and the second PMF with the relative angle $\phi$ of the values 0°, 10°, 20°, . . . , 80° and the black point 71 corresponds to the eigenstate of the first PMF. White points represent principal states of a concatenation of the first PMF, the second polarization converter and the second PMF with the same values of $\phi$ in a range of wavelength between 1549.95 nm and 1550.05 nm. With an increasing angle $\phi$ (0°≦$\phi$≦90°) the DGD decreases (from $\tau_1+\tau_2$ to $|\tau_1-\tau_2|$) and the PSP rotation rate increases. From the left-side sphere 72 to the right-side sphere 73, the absolute angle of the eigenaxis is changed while the relative angle $\phi$ between the eigenaxes is held constant. With this type of change the functions of the DGD and PSP rotation rate do not change.

Figure 15:
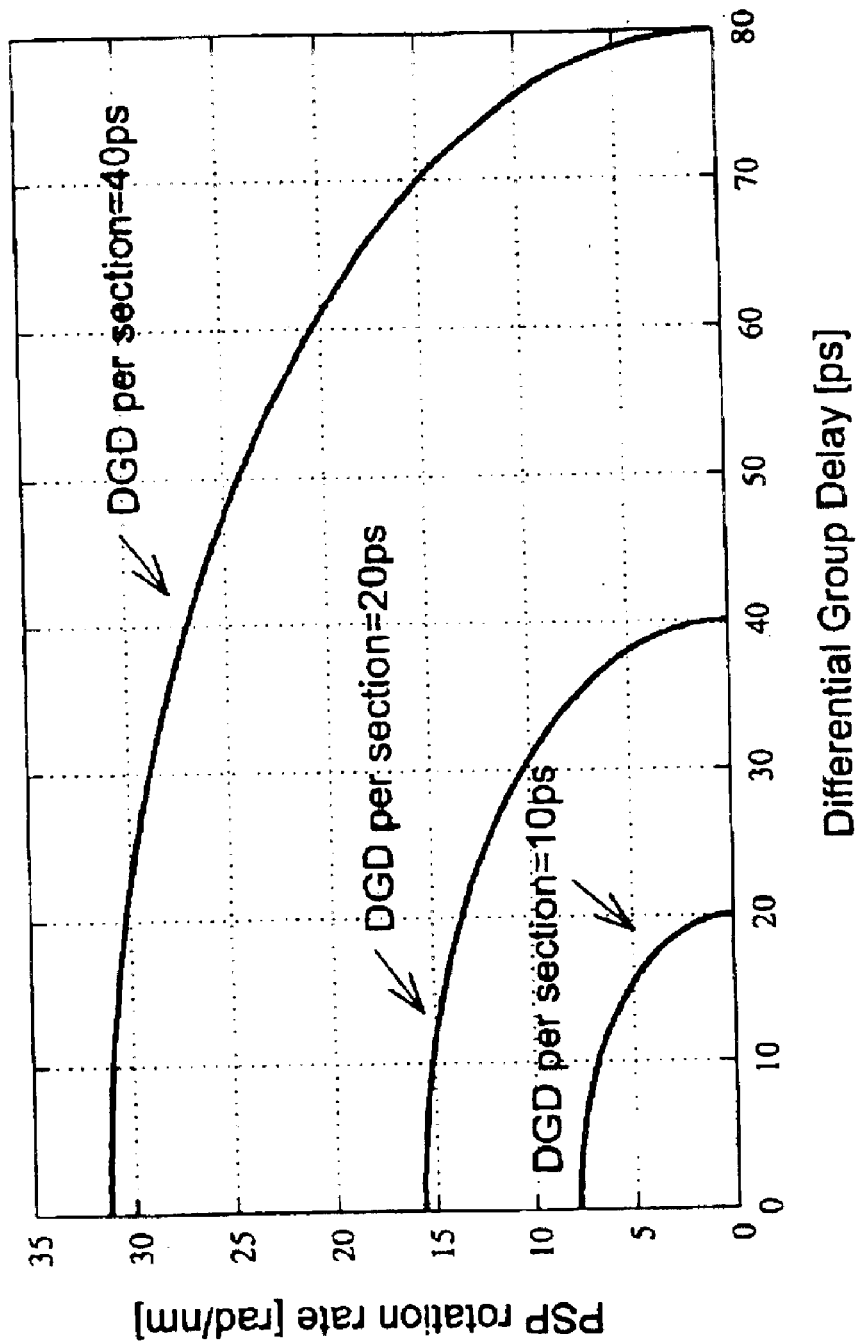
FIG. 15 shows relation between adjusted DGD and PSP rotation rate.

Depicted in FIG. 15 is the relation between adjusted DGD and PSP rotation rate to further clarify the adjustment range of a two-stage compensation scheme. Exemplified shown is the DGD and PSP rotation rate dependence for two-stage compensators with a DGD of the sections (stages) of 10, 20 and 40 ps. The DGD per section is nearly equal to the DGD of the PMF because the DGD of the polarization converter is, if properly constructed, negligible. The same graphs are obtained independent on whether a fully functional polarization converter is placed between the PMF sections or the PMFs are rotated against each other.

Figure 16:
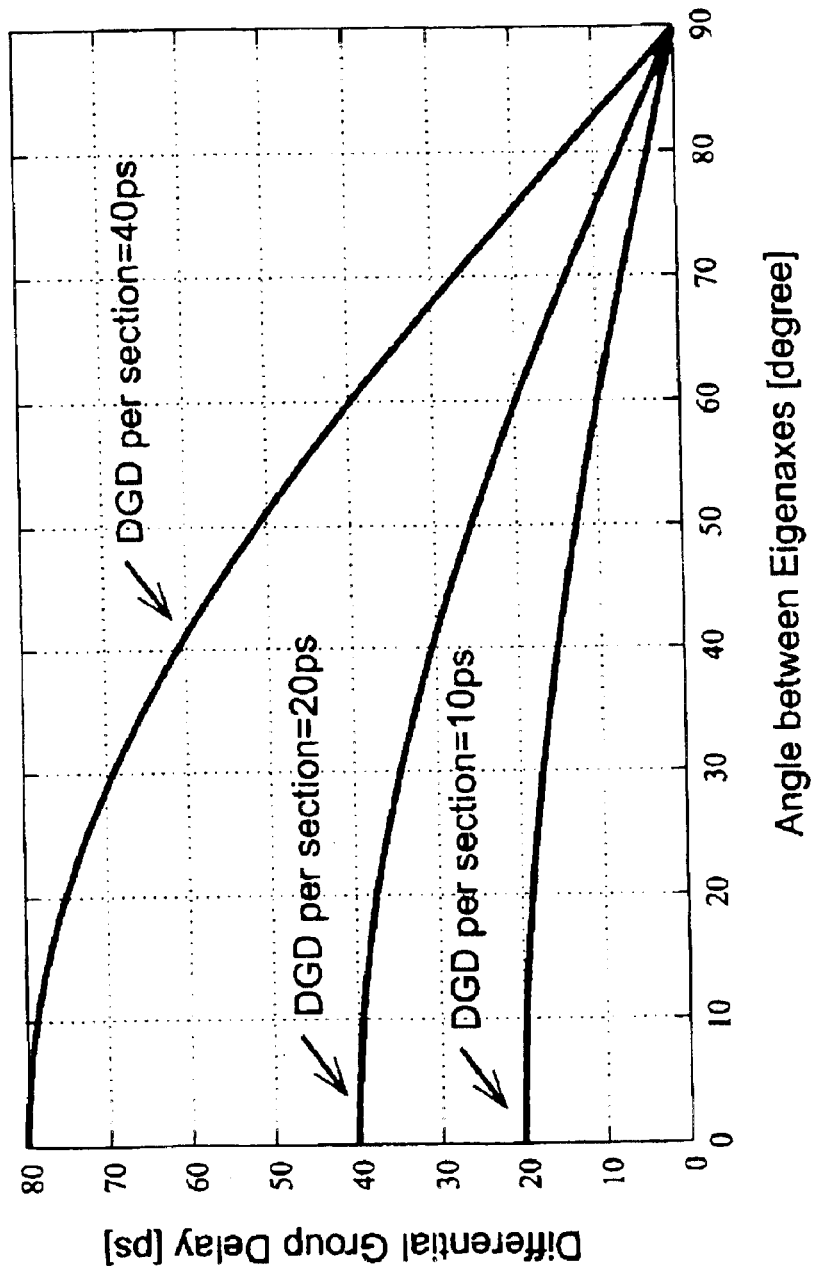
FIG. 16 shows dependence of DGDs on the angle between eigenaxes of PMFs.
Figure 17:
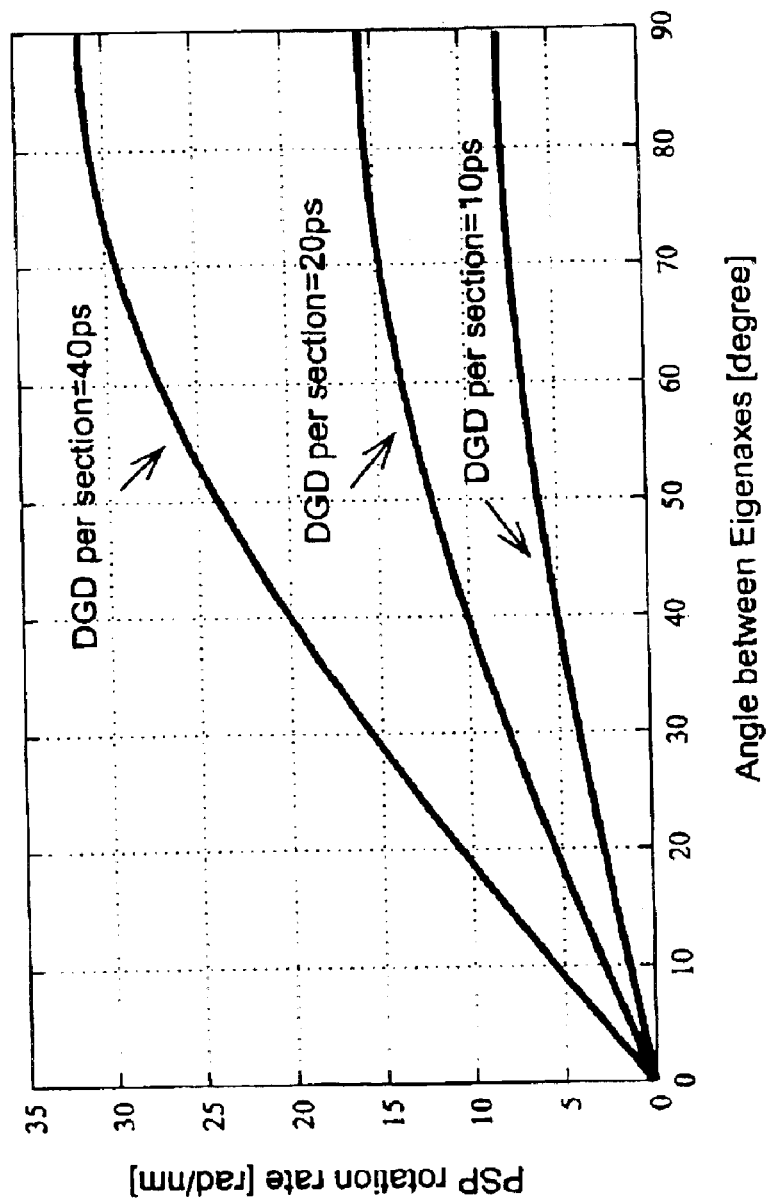
FIG. 17 shows dependence of PSP rotation rates on the angle between eigenaxes of PMFs.

Shown in FIGS. 16 and 17 is the dependence of the DGD and the PSP rotation rate, respectively, on the angle between the eigenaxes of the PMFs. The dependence is exemplified for a two-stage compensation scheme with a DGD of the sections of 10, 20 and 40 ps.

If, for example, the polarization converter is made by using variable birefringent (0–2π retardance range) plates, at least three plates are required to allow the conversion of any input SOP to an arbitrary output SOP and one control signal is required to control each plate. This means that a two-stage PMDC requires at least 6 feedback signals from the distortion analyzer. Replacing the second polarization converter between the PMFs by a mode-coupling adjuster such as a phase shifter, which can be realized by using e.g. one variable birefringent plate, the number of necessary control signals for the plates is reduced from 6 to 4. Because a polarization converter rotates the polarization in a spherical coordinate system, the degrees of freedom are reduced from 4 to 3 for the two-stage PMDC with reduced complexity.

For realization of the above described two stage PMD compensation scheme with reduced complexity the following realizations are possible.

1. Mechanical Rotation of the PMF

Figure 18:
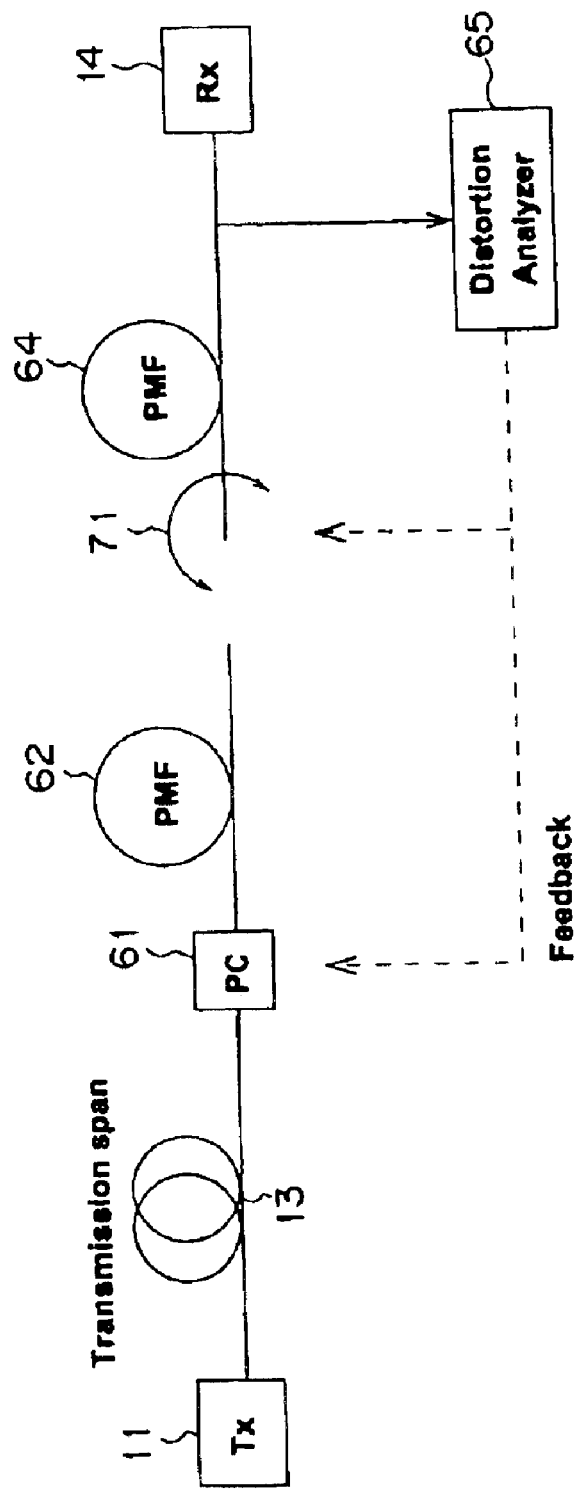
FIG. 18 shows the first two-stage PMDC.

FIG. 18 shows a system including this type of two-stage PMDC. This system has a configuration similar to that shown in FIG. 13, except that the second polarization converter 63 is replaced with a mechanical rotator 71 which operates as a mode-coupling adjuster.

2. Insertion of a Rotatable Waveplate (Retardation Plate) Between the PMFs

Figure 19:
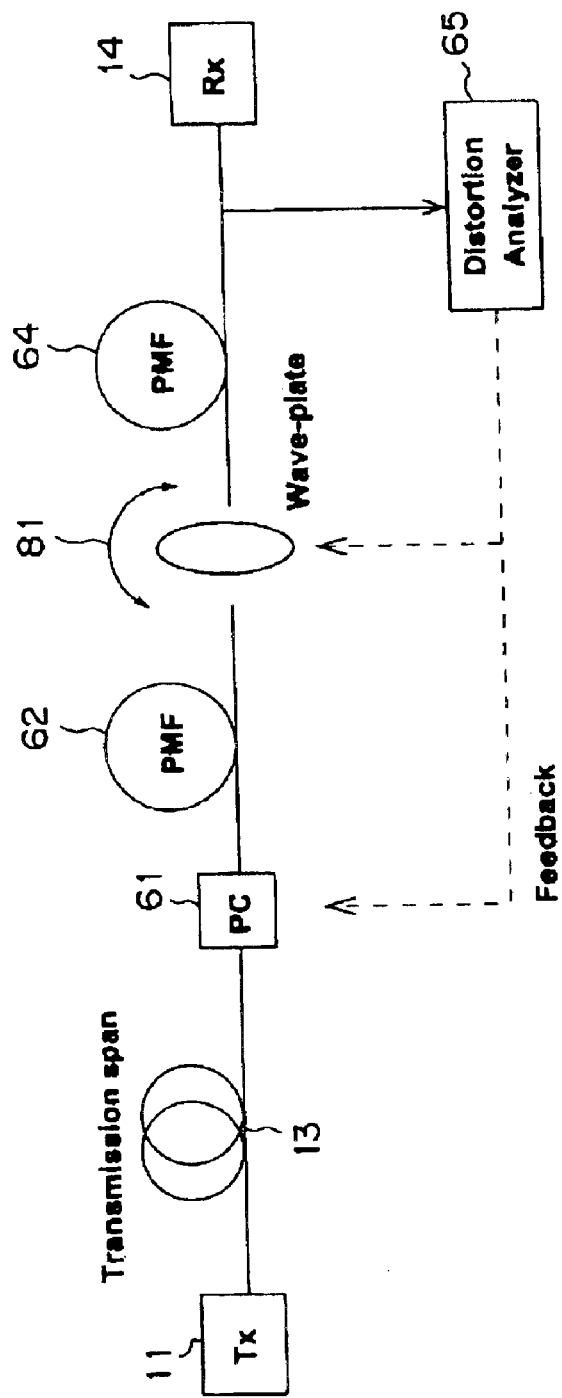
FIG. 19 shows the second two-stage PMDC.

FIG. 19 shows a system including this type of two-stage PMDC. This system has a configuration similar to that shown in FIG. 13, except that the second polarization converter 63 is replaced with a rotatable waveplate 81. The rotatable waveplate 81 is a fixed phase shifter with adjustable eigenstates and operates as a mode-coupling adjuster.

3. Insertion of a Variable Birefringent Plate Between the PMFs

Figure 20:
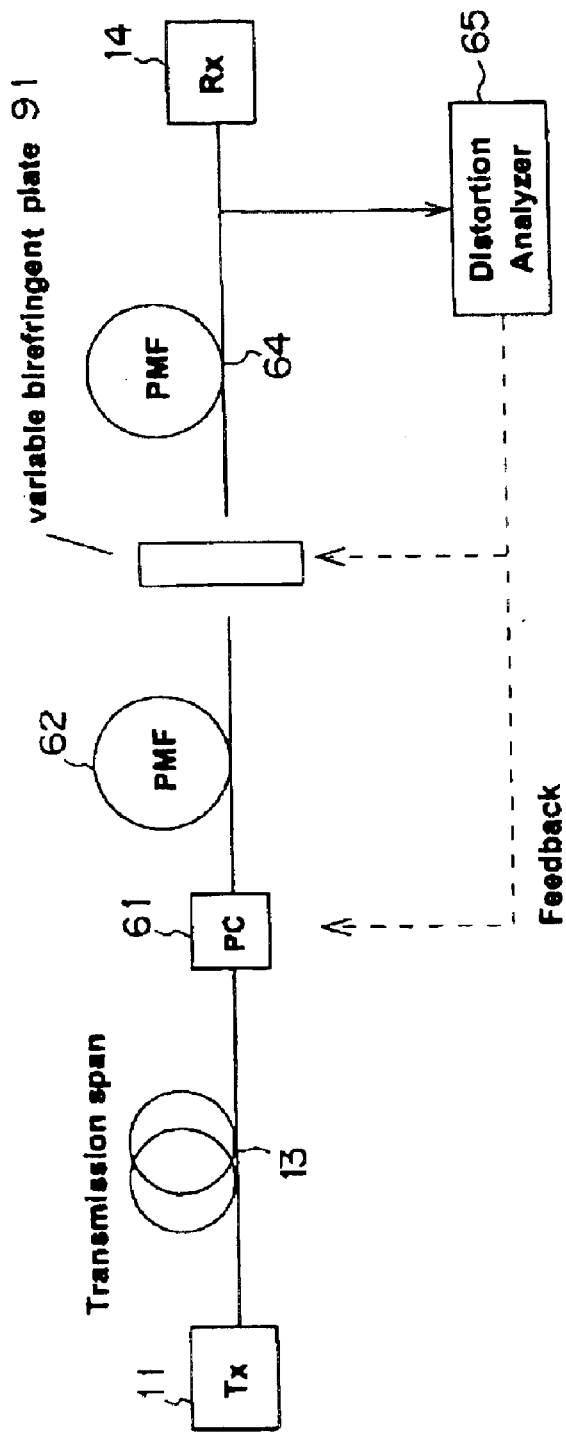
FIG. 20 shows the third two-stage PMDC.

FIG. 20 shows a system including this type of two-stage PMDC. This system has a configuration similar to that shown in FIG. 13, except that the second polarization converter 63 is replaced with a variable birefringent plate 91. The variable birefringent plate 91 is an adjustable phase shifter and operates as a mode-coupling adjuster.

For the systems shown in FIGS. 19 and 20, the polarization maintaining is best to be aligned angular such that there eigenaxes match. In the system shown in FIG. 19, the retardation of the rotatable waveplate is best to be $\lambda/2$. This would assure the same adjustment range as realizable by means of mechanical rotation as shown in FIG. 18. While a lower retardation reduces adjustment range, a higher retardation does not reduce adjustment range but leads to stronger dependence of DGD and PSP rotation rate on rotation angle. In the system shown in FIG. 20, the variable birefringent plate 91 is best to be aligned with its eigenaxis by an angle of 45° with respect to the eigenaxis of the PMFs. In order to realize the same adjustment range as by means of mechanical rotation, the birefringence should be variable between 0 and $2\pi$.

All three realization possibilities have the advantage of reduced complexity compared to compensation schemes making use of cascaded polarization converter and PMF without limiting the operating range. This in principle allows to make the necessary control logic simpler and to enhance the speed at which the control algorithm can adaptively change the characteristic of the compensator to match the PMD characteristic of the transmission span.

Although the PMF of the two sections introduces a DGD to a light beam propagating within it, an arbitrary birefringent element (or a DGD device) can also be used to introduce a DGD. This can be realized by the following means.

1. birefringent crystals (e.g. Titanium dioxide ($TiO_2$), Yttriumorthovanadate ($YVO_4$), natural Calcite ($CaCO_3$))
2. an integrated optic device where the birefringence of the substrate ($LiNbO_3$) is used to realize the DGD
3. a combination of a PBS, different path lengths and a PBC Furthermore, in order to adapt the adjustment range of the proposed two-stage compensation scheme to the PMD value of the transmission span, not necessarily equal DGDs for the two sections can be selected.

From a physical point of view possible control algorithms (operation methods) for the two-stage PMDC are described as follows.

1st Operation Method:
a) adjust DGD of the PMDC with the mode-coupling adjuster such that the DGD is maximum (PSP rotation rate=0°/GHz)
b) align a PSP of the whole system (the concatenation of the transmission span and the PMDC) to the input SOP of an optical signal, which is input to the transmission span by the transmitter, with the first polarization converter→1st-order simple compensation
c) reduce the DGD of the PMDC with the mode-coupling adjuster while still aligning the PSP of the whole system to the input SOP until the PSP rotation rate of the whole system is minimized→2nd-order PSP rotation rate compensation
d) work by the 2nd operation method described below until the DGD of the PMDC becomes lower than the DGD of the transmission span 2nd Operation Method:
a) adjust the DGD of the PMDC with the mode-coupling adjuster such that the DGD equals the DGD of the transmission span
b) rotate PSP of the PMDC with the first polarization converter until it is aligned to the output PSP of the transmission span By performing the operations a)–c) of the 1st operation method, the PSP of the whole system is aligned to the input SOP at spectral components in a broader wavelength range, i.e., not only at the center wavelength but also at the other spectral components in the range.

Due to the statistical nature of PMD, however, it can happen that the DGD of the transmission span becomes higher than the highest adjustable DGD of the PMDC. In this case, the 1st operation method is no longer applicable and the PMDC performs operation according to the 2nd operation method. There is some gray region if the DGD of the transmission is just slightly higher than the highest adjustable DGD.

In this region, the 1st operation method may lead to a better signal improvement than the 2nd operation method. The greater the difference between the transmission span's and PMDC's maximum DGDs, the more unlikely it is that the 1st operation method succeeds. It is also pointed out that the 1st operation method may perform better even if the transmission span's DGD is lower than the PMDC's maximum DGD. Both methods can be used alternatively in this region and which one performs better can not be decided in general.

While the description of the embodiments focuses on a PMD compensation scheme, a PMD compensating system further requires a feedback signal carrying information on signal distortion to allow a control logic to adaptively adjust variable parameters of the compensation scheme. In order to realize a PMDC with the proposed two-stage scheme, any of already proposed schemes is applicable. This includes but is not limited to spectral-hole burning (C. Glingener, A. Schöpflin, A. Färbert, G. Fischer, R. Noé, D. Sandel, S. Hinz, M. Yoshida-Dierolf, V. Mirvoda, G. Feise, H. Herrmann, R. Ricken, W. Sohler, and F. Wehrmann, "Polarization mode dispersion compensation at 20 Gb/s with a compact distributed equalizer in $LiNbO_3$," OFC'99, paper PD29, 1999; G. Ishikawa and H. Ooi, "Polarization-mode dispersion sensitivity and monitoring in 40-Gbit/s OTDM and 10-Gbit/s NRZ transmission experiments," OFC'98, paper WC5, pp. 117–119, 1998), degree of polarization (N. Kikuchi and S. Sasaki, "Polarization-mode dispersion (PMD) detection sensitivity of degree of polarization method for PMD compensation," ECOC'99, pp. II 8–II 9, 1999; H. Rosenfeldt, R. Ulrich, U. Feiste, R. Ludwig, H. G. Weber, and A. Ehrhardt, "PMD compensation in 10 Gbit/s NRZ field experiment using polarimetric error signal," Electronics Letters, Vol. 36, No. 5, pp. 448–450, 2000) or eye-opening measurement.

In such a real PMDC, the distortion analyzer provides the control logic with a measure which has to be maximized. Therefore, just the feedback signal from the distortion analyzer is maximized by varying adjustable parameters of the PMDC. Thus, the control logic automatically finds the best operation method from a physical point of view.

According to the present invention, not only the 1st-order PMD but also higher-order PMD is compensated for by a multi-stage compensation scheme, thereby not only PMD at the center wavelength in a wavelength range but also that at the other spectral components is compensated for. Thus, the performance of a PMDC is higher than that of a conventional one-stage PMDC.

Further, using a mode-coupling adjuster instead of a fully functional polarization converter, the complexity of the PMDC can be reduced without limiting the performance or adjustment range.

What is claimed is:

1. A polarization mode dispersion compensator for an optical transmission line, comprising:
 a principal-state-of-polarization adjuster aligning a principal state of polarization of a concatenation of the optical transmission line and the polarization mode dispersion compensator, to an input state of polarization of an optical signal input to the optical transmission line; and
 a mode-coupling adjuster adjusting mode-coupling in the polarization mode dispersion compensator.

2. A polarization mode dispersion compensator for an optical transmission line, comprising:
 a principal-state-of-polarization adjuster aligning a principal state of polarization of a concatenation of the optical transmission line and the polarization mode dispersion compensator, to an input state of polarization of an optical signal input to the optical transmission line;
 a first birefringent element following said principal-state-of-polarization adjuster;
 a mode-coupling adjuster following said first birefringent element and adjusting mode-coupling in the polarization mode dispersion compensator; and
 a second birefringent element following said mode-coupling adjuster.

3. The polarization mode dispersion compensator according to claim 2, wherein
 said principal-state-of-polarization adjuster aligns the principal state of polarization of the concatenation of the transmission line and the compensator to the input state of polarization of the optical signal at a plurality of spectral components in a wavelength range.

4. The polarization mode dispersion compensator according to claim 2, wherein
 said mode-coupling adjuster adjusts a differential group delay of said first and second birefringent elements and a rotation rate of a principal state of polarization of said first and second birefringent elements.

5. The polarization mode dispersion compensator according to claim 2, wherein
 said mode-coupling adjuster corresponds to one of a mechanical rotator, a rotatable retardation plate and a variable birefringent plate.

6. The polarization mode dispersion compensator according to claim 2, wherein
 said mode-coupling adjuster corresponds to a fixed angle between eigenaxes of said first and second birefringent elements, the angle and differential group delay values of said first and second birefringent elements being chosen such that a realized rotation rate of a principal state of polarization of the compensator does only introduce an acceptable amount of signal distortion for a case where a rotation rate of a principal state of polarization of the optical transmission line becomes zero due to environmental fluctuations.

7. A method of compensating for polarization mode dispersion on an optical transmission line using a polarization mode dispersion compensator, comprising:
 adjusting a differential group delay of the polarization mode dispersion compensator such that the differential group delay is maximum;
 aligning a principal state of polarization of a concatenation of the optical transmission line and the polarization mode dispersion compensator, to an input state of polarization of an optical signal input to the optical transmission line; and
 reducing the differential group delay of the polarization mode dispersion compensator while still aligning the principal state of polarization of the concatenation of the transmission line and the compensator to the input state of polarization, until a rotation rate of a principal state of polarization of the concatenation of the transmission line and the compensator is minimized.

8. A polarization mode dispersion compensator for an optical transmission line, comprising:
 principal-state-of-polarization adjuster means for aligning a principal state of polarization of a concatenation of the optical transmission line and the polarization mode dispersion compensator, to an input state of polarization of an optical signal input to the optical transmission line; and
 mode-coupling adjuster means for adjusting mode-coupling in the polarization mode dispersion compensator.

9. A polarization mode dispersion compensator for an optical transmission line, comprising:
 principal-state-of-polarization adjuster means for aligning a principal state of polarization of a concatenation of the optical transmission line and the polarization mode dispersion compensator, to an input state of polarization of an optical signal input to the optical transmission line;
 first birefringent element means following said principal-state-of-polarization adjuster means;
 mode-coupling adjuster means following said first birefringent element means, for adjusting mode-coupling in the polarization mode dispersion compensator; and
 second birefringent element means following said mode-coupling adjuster means.

* * * * *